United States Patent
Chen et al.

(10) Patent No.: US 10,921,119 B2
(45) Date of Patent: Feb. 16, 2021

(54) THREE DIMENSIONAL IMAGE MEASUREMENT SYSTEM

(71) Applicant: Industrial Technology Research Institute, Hsinchu (TW)

(72) Inventors: Yu-Wen Chen, New Taipei (TW); Te-Mei Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 468 days.

(21) Appl. No.: 15/792,781

(22) Filed: Oct. 25, 2017

(65) Prior Publication Data
US 2019/0056217 A1 Feb. 21, 2019

(30) Foreign Application Priority Data
Aug. 18, 2017 (TW) .............................. 106128064 A (51) Int. Cl.
*G01B 11/25* (2006.01)
*G02B 27/09* (2006.01)
(Continued)

(52) U.S. Cl.
CPC ........ *G01B 11/254* (2013.01); *G01B 11/2513* (2013.01); *G01B 11/2518* (2013.01);
(Continued)

(58) Field of Classification Search
CPC .............. G01B 11/254; G01B 11/2513; G01B 11/2518; G01S 7/4814; G01S 7/484;
(Continued)

(56) References Cited

U.S. PATENT DOCUMENTS

| 4,678,324 A | 7/1987 | De Witt |
| 6,052,189 A * | 4/2000 | Fuse ................. G01B 11/0608 356/615 |

(Continued)

FOREIGN PATENT DOCUMENTS

| CN | 103399414 | 11/2013 |
| TW | 201132932 | 10/2011 |
| TW | I460468 | 11/2014 |
| TW | I547685 | 9/2016 |

OTHER PUBLICATIONS

"Office Action of Taiwan Counterpart Application", dated Mar. 15, 2018, p. 1-p. 6, in which the listed references were cited.

*Primary Examiner* — Isam A Alsomiri
*Assistant Examiner* — Amir J Askarian
(74) *Attorney, Agent, or Firm* — JCIPRNET (57) ABSTRACT

A three dimensional image measurement system including a first optical system and a second optical system is provided. The first optical system is adapted to output a structural light beam and a zero order light beam. There is an angle between the structural light beam and the zero order light beam. The first optical system performs an optical operation to project the structural light beam to a three dimensional object to obtain three dimensional information of the three dimensional object. The second optical system is adapted to receive the zero order light beam and perform another optical operation by using the zero order light beam. The first optical system includes a plurality of optical elements. The value of the angle between the structural light beam and the zero order light beam is determined according to position parameters of the optical elements.

11 Claims, 7 Drawing Sheets

(51) Int. Cl.
*G02B 27/42* (2006.01)
*G01S 7/484* (2006.01)
*G01S 17/89* (2020.01)
*G01S 7/481* (2006.01)
*G01S 17/931* (2020.01)

(52) U.S. Cl.
CPC ............ *G01S 7/484* (2013.01); *G01S 7/4814* (2013.01); *G01S 17/89* (2013.01); *G01S 17/931* (2020.01); *G02B 27/0944* (2013.01); *G02B 27/4266* (2013.01); *G02B 27/4277* (2013.01)

(58) Field of Classification Search
CPC . G01S 17/89; G02B 27/0944; G02B 27/4266; G02B 27/4277
See application file for complete search history.

(56) References Cited

U.S. PATENT DOCUMENTS

| | | | |
|---|---|---|---|
| 8,630,039 B2 | 1/2014 | Shpunt | |
| 9,503,708 B2 | 11/2016 | Hazeghi et al. | |
| 2007/0146473 A1* | 6/2007 | Masuda | G02B 27/144 |
| | | | 347/246 |
| 2009/0185274 A1 | 7/2009 | Shpunt | |
| 2009/0261979 A1* | 10/2009 | Breed | B60J 10/00 |
| | | | 340/576 |
| 2012/0038986 A1 | 2/2012 | Pesach | |
| 2014/0104051 A1* | 4/2014 | Breed | G08G 1/096791 |
| | | | 340/435 |
| 2016/0127714 A1 | 5/2016 | Hazeghi et al. | |

\* cited by examiner

THREE DIMENSIONAL IMAGE MEASUREMENT SYSTEM

CROSS-REFERENCE TO RELATED APPLICATION

This application claims the priority benefit of Taiwan application serial no. 106128064, filed on Aug. 18, 2017. The entirety of the above-mentioned patent application is hereby incorporated by reference herein and made a part of this specification.

BACKGROUND

Technical Field

The disclosure relates to a three dimensional (3D) image measurement system.

Background

In recent years, the technique of using a 3D scanning reconstruction model to measure the 3D image of a target object has been widely applied to various fields. The 3D scanning reconstruction model technique may be roughly categorized into the following types: passive stereo, active stereo, shape from shading, and photometric stereo. The active stereo reconstruction method uses an additional light source or a laser projector to scan the object for reconstructing the 3D image. When compared with the passive stereo reconstruction method, the active stereo reconstruction method makes it easier to calculate the corresponding points in the image, and the image accuracy is also higher.

However, in the existing 3D image measurement system, the light beam provided by the additional light source or laser projector will form a structural light beam and a zero order light beam after passing through the diffractive element. Besides, the zero order light beam will form a zero order in the projection image of the structural light beam. The zero order affects the quality of the projection image. Moreover, the zero order light beam cannot be used and thus is a waste of energy.

SUMMARY

The 3D image measurement system of the disclosure includes a first optical system and a second optical system. The first optical system is adapted to output a structural light beam and a zero order light beam, and an angle exists between the structural light beam and the zero order light beam. The first optical system performs an optical operation to project the structural light beam to a 3D object, so as to obtain 3D information of the 3D object. The second optical system is adapted to receive the zero order light beam and perform another optical operation by using the zero order light beam. The first optical system includes a plurality of optical elements. The value of the angle between the structural light beam and the zero order light beam is determined according to position parameters of the elements.

To make the aforementioned more comprehensible, several embodiments accompanied with figures are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In an exemplary embodiment of the disclosure, a 3D image measurement system includes two optical systems. The first optical system performs an optical operation and outputs a zero order light beam, and the second optical system performs another optical operation by using the zero order light beam outputted by the first optical system. For example, the 3D image measurement system includes an off-axis structural light projection system and a MEMS (Microelectromechanical Systems) scanning system. The off-axis structural light projection system may separate a zero order from a structured light pattern (which may serve as a projection image), and output the zero order light beam to the MEMS scanning system. The MEMS scanning system then performs a scanning operation on the same or different target objects by using the zero order light beam, so as to form a composite 3D image measurement system with the off-axis structural light projection system for 3D image measurement and reconstruction. The 3D image measurement system is capable of excluding an image that the zero order causes in the structured light pattern in the conventional technology, and selecting the off-axis structural light projection system and/or the MEMS scanning system for the target object according to different situations. Several exemplary embodiments are provided below to explain the 3D image measurement system of the disclosure.

Figure 1:
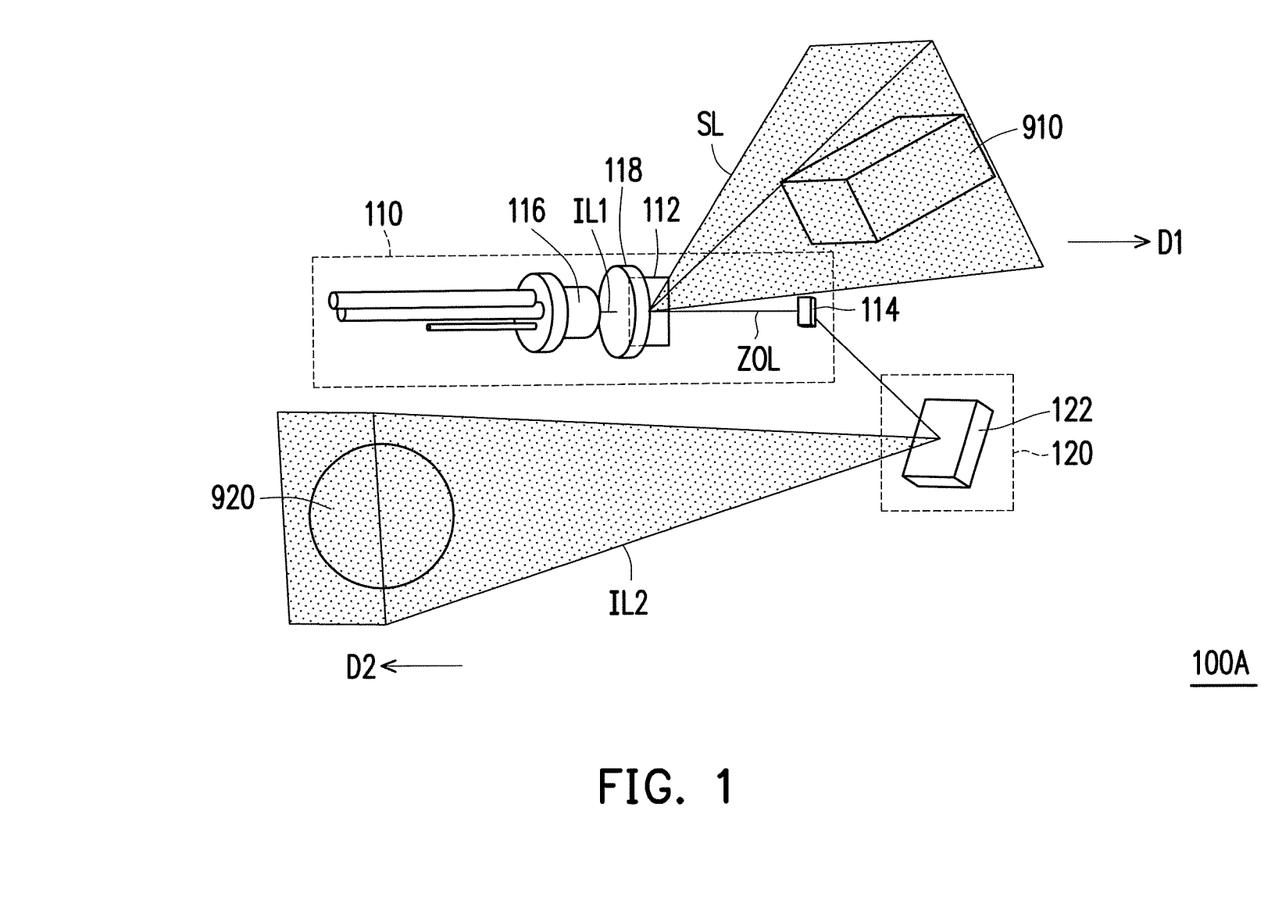
FIG. 1 is a schematic diagram of a composite 3D image measurement system that light beams have reverse traveling directions according to an exemplary embodiment of the disclosure.

FIG. 1 is a schematic diagram of a composite 3D image measurement system that light beams have reverse traveling directions according to an exemplary embodiment of the disclosure. Referring to FIG. 1, a 3D image measurement system 100A of this embodiment includes a first optical system 110 and a second optical system 120. The first optical system 110 includes a projection light source module 116, a diffractive optical element (DOE) 112, and a beam shaping element (BSE) 114. The projection light source module 116 outputs a light beam IL1 to the diffractive optical element 112. In this embodiment, an element 118 between the projection light source module 116 and the diffractive optical element 112 is a collimator, which may be collectively referred to as the projection light source module together with the projection light source module 116. In this embodiment, the diffractive optical element 112 may be designed to have different functions, such as light splitting function, light focusing function, light refracting function, and so on, for different applications. In this embodiment, the projection light source module 116 includes a laser diode, for example, to provide a laser light beam as the light beam IL1. The light beam IL1 travels to the diffractive optical element 112 and is diffracted. The diffractive optical element 112 divides the light beam into a structural light beam SL and a zero order light beam ZOL. The structural light beam SL is projected to a target object 910 (3D object) to form a structured light pattern on a surface thereof to serve as the projection image, so as to obtain 3D information of the target object 910. A 3D image of the target object 910 is measured and reconstructed based on the obtained 3D information. The zero order light beam ZOL travels to the beam shaping element 114, which corresponds to a zero order formed outside the structured light pattern by the diffracted light beam ILL In this embodiment, the power of the structural light beam SL is about 85% to 90% of the power of the light beam ILL and the power of the zero order light beam ZOL is about 10% to 15% of the power of the light beam IL1. Nevertheless, the power ratios of the structural light beam SL and the zero order light beam ZOL to the light beam IL1 as described above are merely examples and should not be construed as a limitation to the disclosure. In this embodiment, the second optical system 120 includes a time-of-flight (TOF) system, a phase shift system, a triangulation system, or a MEMS scanning system, for example. This embodiment is described based on the MEMS scanning system as an example. The second optical system 120 includes a scanning mirror element 122 of the MEMS scanning system. The beam shaping element 114 of the first optical system 110 reforms a light shape of the zero order light beam ZOL, and refracts and focuses the zero order light beam ZOL onto the scanning mirror element 122 in the second optical system 120. The scanning mirror element 122 then performs a scanning operation on a target object 920 to measure and reconstruct a 3D image of the target object 920. In this embodiment, the second optical system 120 may include other suitable elements to coordinate with the scanning mirror element 122 to complete measurement and reconstruction of the 3D image. Detailed steps and implementation thereof can be understood sufficiently from the teaching, suggestion, and illustration of the common knowledge in this field.

In this embodiment, the structural light beam SL and the zero order light beam ZOL outputted from the diffractive optical element 112 travelling substantially along a direction D1, and a light beam IL2 outputted from the scanning mirror element 122 travels substantially along a direction D2. The direction D1 is reverse to the direction D2. In an embodiment, the traveling direction of the light beam IL2 may be the same as the direction D1.

Figure 2:
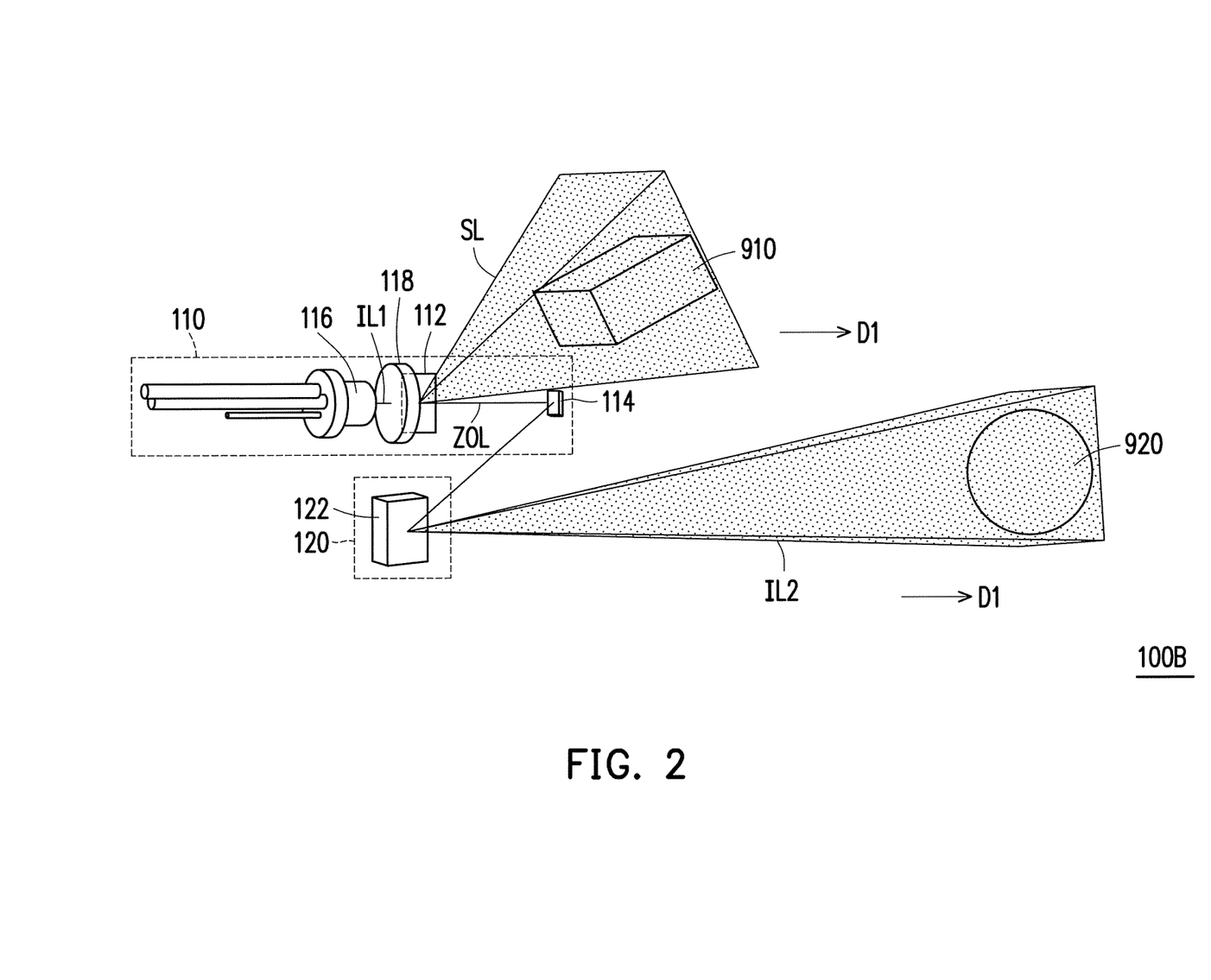
FIG. 2 is a schematic diagram of a composite 3D image measurement system that light beams have the same traveling direction according to an exemplary embodiment of the disclosure.

FIG. 2 is a schematic diagram of a composite 3D image measurement system that light beams have the same traveling direction according to an exemplary embodiment of the disclosure. Referring to FIG. 1 and FIG. 2, in the composite 3D image measurement system 100B that light beams have the same traveling direction, the beam shaping element 114 reforms the light shape of the zero order light beam ZOL and reflects and focuses the zero order light beam ZOL onto the scanning mirror element 122 in the second optical system 120. The scanning mirror element 122 then performs the scanning operation on the target object 920 to measure and reconstruct the 3D image of the target object 920. In this embodiment, the light beam IL2 outputted from the scanning mirror element 122 travels substantially along the direction D1, and the traveling direction thereof is the same as those of the structural light beam SL and the zero order light beam ZOL.

In the embodiments of FIG. 1 and FIG. 2, the zero order light beam ZOL is outside the structured light pattern SM that serves as the projection image. Therefore, the zero order formed by the diffracted light beam IL1 does not affect the quality of the projection image. Moreover, the zero order light beam ZOL may be used again by the second optical system 120, for example, to serve as the light source required for a time-of-flight (TOF) operation, a phase shift operation, a triangulation operation, or a MEMS scanning operation. In the exemplary embodiments of the disclosure, the second optical system 120 may include other suitable elements for performing the time-of-flight (TOF) operation, the phase shift operation, the triangulation operation, the MEMS scanning operation, or the structural light 3D image measurement operation. Detailed steps and implementation thereof can be understood sufficiently from the teaching, suggestion, and illustration of the common knowledge in this field.

Figure 3:
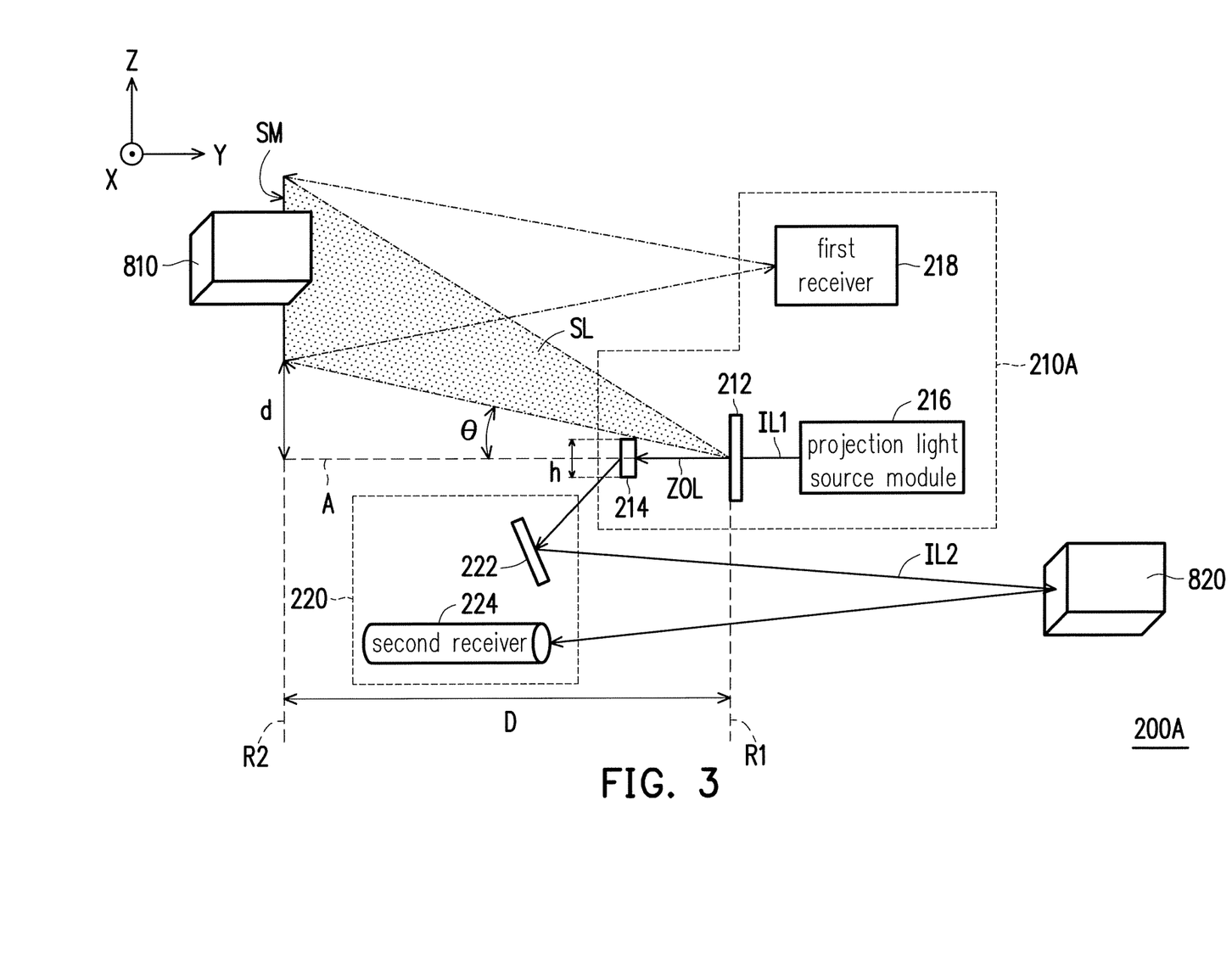
FIG. 3 is a schematic diagram of a composite 3D image measurement system according to an exemplary embodiment of the disclosure.

FIG. 3 is a schematic diagram of a composite 3D image measurement system according to an exemplary embodiment of the disclosure. A 3D image measurement system 200A of this embodiment includes a first optical system 210A and a second optical system 220. The first optical system 210A includes a projection light source module 216, a diffractive optical element 212, a beam shaping element 214, and a first receiver 218. The diffractive optical element 212 and the beam shaping element 214 are disposed on an optical axis A. The second optical system 220 includes a scanning mirror element 222 and a second receiver 224. In this embodiment, the first optical system 210A outputs a structural light beam SL and a zero order light beam ZOL. An angle θ exists between the structural light beam SL and the zero order light beam ZOL. The first optical system 210A performs an optical operation to project the structural light beam SL to a 3D object 810 to obtain 3D information of the 3D object 810, and measures and reconstructs a 3D image thereof. The second optical system 220 receives the zero order light beam ZOL and performs another optical operation by using the zero order light beam ZOL, for example, performing the MEMS scanning operation on the 3D object 820. In an embodiment, the second optical system 220 may include other suitable optical elements for performing the time-of-flight (TOF) operation, the phase shift operation, the triangulation operation, or the structural light 3D image measurement operation.

Figure 4:
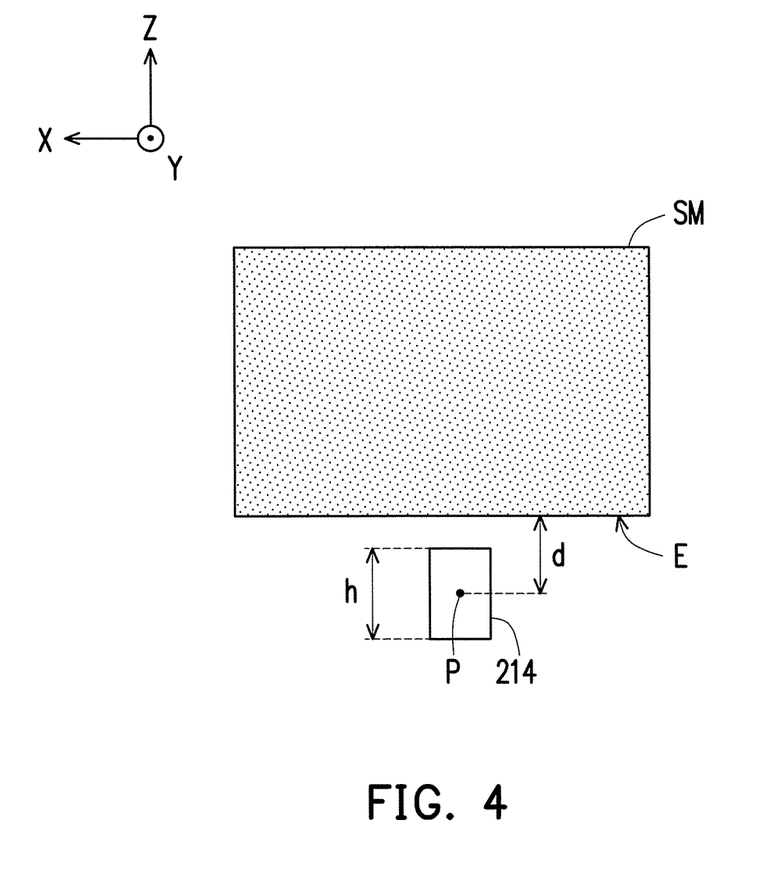
FIG. 4 is a schematic diagram showing a projection of a beam shaping element on a second reference plane and a structured light pattern according to the exemplary embodiment of FIG. 3.

In this embodiment, the value of the angle θ between the structural light beam SL and the zero order light beam ZOL is determined according to position parameters of the optical elements in the first optical system 210A, for example, the position parameters of the diffractive optical element 212 and the beam shaping element 214. More specifically, FIG. 4 is a schematic diagram showing a projection of the beam shaping element on a second reference plane and the structured light pattern according to the exemplary embodiment of FIG. 3. Referring to FIG. 3 and FIG. 4, in this embodiment, the diffractive optical element 212 is disposed on a first reference plane R1. The structural light beam SL is projected onto a second reference plane R2 to form the structured light pattern. The optical axis A is perpendicular to the first reference plane R1 and the second reference plane R2. A distance between the first reference plane R1 and the second reference plane R2 is D. A distance between a center position of the projection of the beam shaping element 214 on the second reference plane R2 and the structured light pattern SM is d. The angle between the structural light beam SL and the zero order light beam ZOL is θ. In this embodiment, the distance D, the distance d, and the angle θ satisfy a first equation d=D×tan θ. In addition, in this embodiment, a projection height of the beam shaping element 214 on the second reference plane R2 is h. The projection height h and the distance d satisfy a second equation d>h/2. The distance D, the distance d, and the projection height h are in the level of microns or millimeters, for example, but this exemplary embodiment is not limited thereto.

In this embodiment, the structural light beam SL includes an edge light beam EL corresponding to a lower edge E of the structured light pattern SM. The angle θ between the structural light beam SL and the zero order light beam ZOL is an angle between the edge light beam EL and the optical axis A. The distance d between the projection of the beam shaping element 214 on the second reference plane R2 and the structured light pattern SM is a distance between the center position P of the projection of the beam shaping element 214 on the second reference plane R2 and the lower edge E of the structured light pattern SM.

In this embodiment, the structural light beam SL is reflected by the 3D object 810 and travels from the 3D object 810 toward the first receiver 218 (first direction) to reach the first receiver 218. The zero order light beam ZOL is projected to the 3D object 820 (target object). The zero order light beam ZOL is reflected by the 3D object 820 and travels from the 3D object 820 toward the second receiver 224 (second direction) to reach the second receiver 224. Thus, in this embodiment, the structural light beam SL and the zero order light beam ZOL reach the corresponding receivers in different traveling directions. In this embodiment, the first receiver 218 and the second receiver 224 respectively include a charge coupled device image sensor (CCD image sensor), a complementary metal oxide semiconductor (CMOS) image sensor, or similar devices, for example. The disclosure is not intended to limit the types of the first receiver 218 and the second receiver 224.

Figure 5:
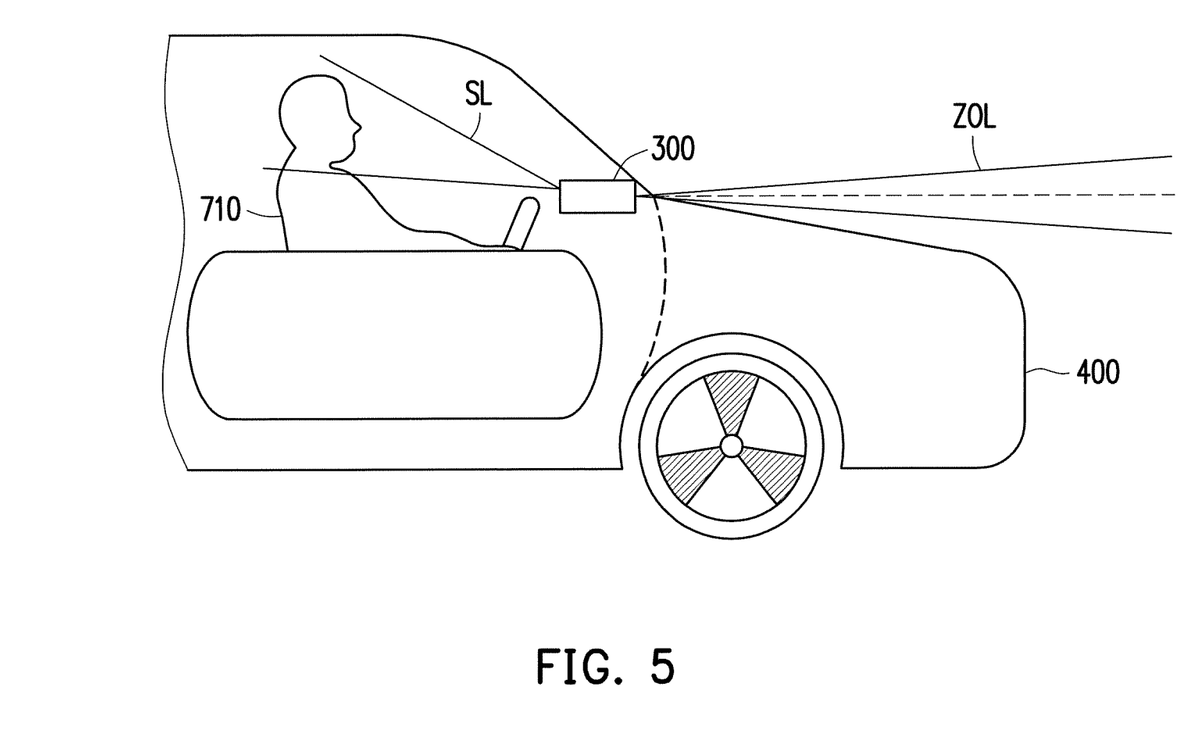
FIG. 5 is a schematic diagram of a vehicle driving assistance device according to an exemplary embodiment of the disclosure.

FIG. 5 is a schematic diagram of a vehicle driving assistance device according to an exemplary embodiment of the disclosure. Referring to FIG. 5, a composite 3D image measurement system 300 of this embodiment may be applied to a vehicle 400 to serve as the vehicle driving assistance device. The 3D image measurement system 300 is disposed in the vehicle 400. The first optical system of the 3D image measurement system 300 is adapted to detect a state, such as facial expression and/or body movement of a driver 710 of the vehicle 400 to serve as a short-range (interior) driver behavior monitoring system. The second optical system is adapted to perform 3D image measurement, e.g., performing the time-of-flight (TOF) operation on another vehicle (not shown), on an object before the vehicle and an exterior scene by using the zero order light beam ZOL to serve as a long-range (exterior) safety distance detection system for detecting a distance between the vehicle 400 and the vehicle before the vehicle 400 and a relative movement state.

Figure 6:
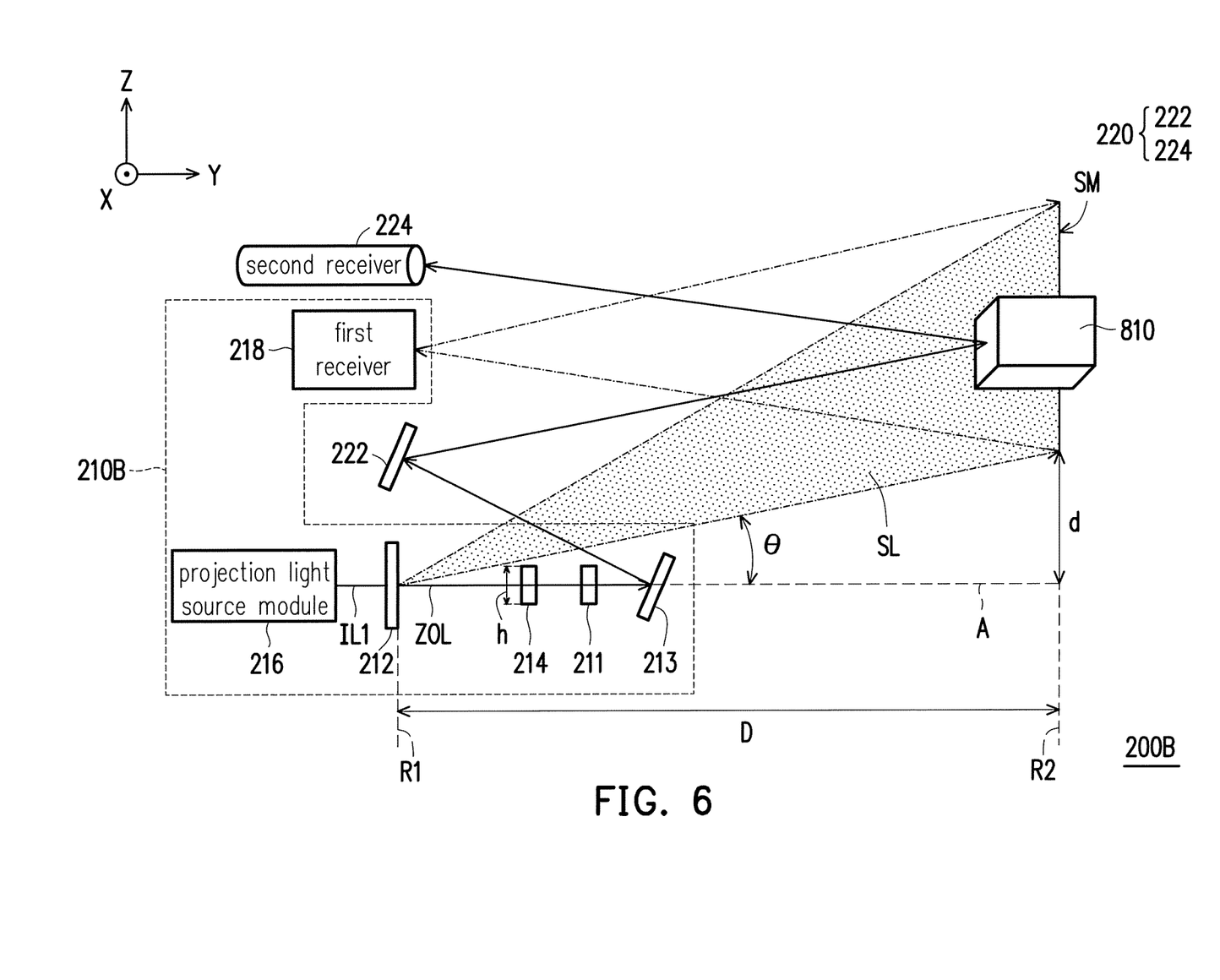
FIG. 6 is a schematic diagram of a composite 3D image measurement system according to another exemplary embodiment of the disclosure.
Figure 7:
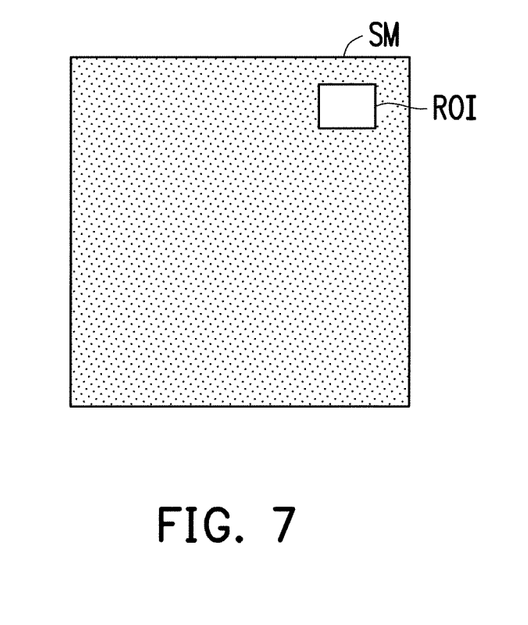
FIG. 7 is a schematic diagram of a structured light pattern projected on a second reference plane according to the exemplary embodiment of FIG. 6.

FIG. 6 is a schematic diagram of a composite 3D image measurement system according to another exemplary embodiment of the disclosure. FIG. 7 is a schematic diagram of the structured light pattern projected on the second reference plane according to the exemplary embodiment of FIG. 6. A 3D image measurement system 200B of this embodiment includes a first optical system 210B and a second optical system 220. The first optical system 210B includes a projection light source module 216, a diffractive optical element 212, a beam shaping element 214, a first receiver 218, a shutter element 211, and a reflective mirror element 213. The projection light source module 216, the diffractive optical element 212, the beam shaping element 214, the shutter element 211, and the reflective mirror element 213 are disposed on an optical axis A. The second optical system 220 includes a scanning mirror element 222 and a second receiver 224.

In this embodiment, the first receiver 218, the shutter element 211, and the second receiver 224 are controlled by a controller (not shown), for example. When the controller controls the shutter element 211 to close, the zero order light beam ZOL from the beam shaping element 214 is not allowed to pass through the shutter element 211. In the meantime, the controller enables the first receiver 218 and disables the second receiver 224, so as to control the first optical system 210B to perform the structural light 3D image measurement operation at this time to measure and reconstruct the 3D image of the 3D object 810. On the other hand, when the controller controls the shutter element 211 to open, the zero order light beam ZOL from the beam shaping element 214 is allowed to pass and travel to the reflective mirror element 213. The reflective mirror element 213 reflects the zero order light beam ZOL to the scanning mirror element 222, such that the second optical system 220 performs the MEMS scanning operation at this time. In the meantime, the controller disables the first receiver 218 and enables the second receiver 224, so as to receive the zero order light beam ZOL reflected by the 3D object 810. In this embodiment, the steps, in which the controller controls the first optical system 210B and the second optical system 220 to respectively perform the structural light 3D image measurement operation and the MEMS scanning operation in different time sections, may be carried out alternately. Nevertheless, the disclosure is not limited thereto.

In this embodiment, the structural light beam SL is reflected by the 3D object 810 and travels from the 3D object 810 toward the first receiver 218 (first direction) to reach the first receiver 218. The zero order light beam ZOL is projected to the 3D object 810. The zero order light beam ZOL is reflected by the 3D object 810 and travels from the 3D object 810 toward the second receiver 224 (first direction) to reach the second receiver 224. Thus, in this embodiment, the structural light beam SL and the zero order light beam ZOL reach the corresponding receivers in the same traveling direction.

In this embodiment, the structural light beam SL is projected onto the structured light pattern SM on the second reference plane R2, as shown in FIG. 7. The scanning mirror element 222 may project the zero order light beam ZOL to a region of interest ROI on the structured light pattern SM for analyzing a specific region of the structured light pattern SM.

To sum up, in the exemplary embodiments of the disclosure, the first optical system divides the light beam from the projection light source module into the structural light beam and the zero order light beam. Since there is an angle between the structural light beam and the zero order light beam, the zero order formed by the zero order light beam does not affect the projection image of the structural light beam. The first optical system performs an optical operation by using the structural light beam. The second optical system receives the zero order light beam and performs another optical operation by using the zero order light beam. The zero order light beam does not affect the projection image of the structural light beam. Therefore, the 3D image measurement system disclosed in the exemplary embodiments of the disclosure projects an image with favorable quality and is capable of integrating different optical operations in one measurement system.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three dimensional image measurement system, comprising:
   a first optical system adapted to output a structural light beam and a zero order light beam, wherein an angle exists between the structural light beam and the zero order light beam, and the first optical system performs an optical operation to project the structural light beam to a three dimensional object to obtain three dimensional information of the three dimensional object; and
   a second optical system adapted to receive the zero order light beam and perform another optical operation by using the zero order light beam,
   wherein the first optical system comprises a plurality of optical elements, and a value of the angle between the structural light beam and the zero order light beam is determined according to a plurality of position parameters of the optical elements, wherein the plurality of optical elements comprises a diffractive optical element and a beam shaping element, and the value of the angle between the structural light beam and the zero order light beam is determined according to a position parameter of the diffractive optical element and a position parameter of the beam shaping element,
   wherein the diffractive optical element is disposed on a first reference plane, the structural light beam is projected onto a second reference plane to form a structured light pattern, the second reference plane is a plane on which a surface of the three dimensional object being projected by the structural light beam to form the structured light pattern is located, a distance between the first reference plane and the second reference plane is D, a distance between a center position of a vertical projection of the beam shaping element on the second reference plane and the structured light pattern is d, and the angle between the structural light beam and the zero order light beam is $\theta$, wherein the distance D, the distance d, and the angle $\theta$ satisfy a first equation $d = D \times \tan \theta$.

2. The three dimensional image measurement system according to claim 1, wherein a projection height of the vertical projection of the beam shaping element on the second reference plane is h, and the projection height h and the distance d satisfy a second equation $d > h/2$.

3. The three dimensional image measurement system according to claim 1, wherein the diffractive optical element and the beam shaping element are disposed on an optical axis of the first optical system, and the optical axis is perpendicular to the first reference plane and the second reference plane.

4. The three dimensional image measurement system according to claim 3, wherein the structural light beam comprises has an edge light beam portion corresponding to an edge of the structured light pattern, the angle $\theta$ between the structural light beam and the zero order light beam is an angle between the edge light beam portion and the optical axis, and the distance d between the center position of the vertical projection of the beam shaping element on the second reference plane and the structured light pattern is a distance between the center position of the vertical projection of the beam shaping element on the second reference plane and the edge of the structured light pattern.

5. The three dimensional image measurement system according to claim 1, wherein the first optical system further comprises a projection light source module adapted to output a light beam that travels to the diffractive optical element and is diffracted, the diffractive optical element divides the light beam into the structural light beam and the zero order light beam, and the beam shaping element focuses the zero order light beam onto an optical element in the second optical system.

6. The three dimensional image measurement system according to claim 1, wherein the first optical system comprises a first receiver and the structural light beam is reflected by the three dimensional object to reach the first receiver in a first direction, and the second optical system comprises a second receiver and the zero order light beam is projected to a target object and reflected by the target object to reach the second receiver in the first direction.

7. The three dimensional image measurement system according to claim 6, further comprising:
   a shutter element disposed on a light beam output side of the beam shaping element, wherein the zero order light beam travels from the light beam output side of the beam shaping element to the shutter element, and the shutter element is adapted to control the zero order light beam to pass or not pass; and
   a controller electrically connected to the first receiver, the shutter element, and the second receiver, and adapted to control the first receiver, the shutter element, and the second receiver, wherein when the controller controls the shutter element to close, the controller enables the first receiver and disables the second receiver, and when the controller controls the shutter element to open, the controller disables the first receiver and enables the second receiver.

8. The three dimensional image measurement system according to claim 6, wherein the structural light beam is projected to a reference plane and forms a structured light pattern, and the zero order light beam is projected to a region of interest on the structured light pattern.

9. The three dimensional image measurement system according to claim 1, wherein the first optical system comprises a first receiver and the structural light beam is reflected by the three dimensional object and reaches the first receiver in a first direction, and the second optical system comprises a second receiver and the zero order light beam is projected to a target object and reflected by the target object to reach the second receiver in a second direction, wherein the first direction and the second direction are different.

10. The three dimensional image measurement system according to claim 9, wherein the first optical system and the second optical system are disposed in a vehicle, and the first optical system is adapted to detect at least one of a facial expression and a body movement of a driver of the vehicle, and the second optical system is adapted to perform a three dimensional image measurement operation on an object and an environment before the vehicle by using the zero order light beam, so as to detect a distance between the vehicle and the object before the vehicle and a relative movement state.

11. The three dimensional image measurement system according to claim 1, wherein an additional optical operation performed by the second optical system by using the zero order light beam is one of a time-of-flight operation, a phase shift operation, a triangulation operation, and a microelectromechanical systems scanning operation.

* * * * *